(12) United States Patent  (10) Patent No.: US 9,095,938 B2
Boettinger et al.  (45) Date of Patent: Aug. 4, 2015

(54) APPARATUS AND METHOD OF MANUFACTURING A DISPLAY AND OPTICAL ELEMENT COMBINATION

(75) Inventors: Michael Boettinger, Neu-Ulm (DE); Martin Punke, Warthausen (DE)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 13/545,336

(22) Filed: Jul. 10, 2012

(65) Prior Publication Data

US 2014/0017438 A1 Jan. 16, 2014

(51) Int. Cl.
*B32B 3/14* (2006.01)
*B23P 17/04* (2006.01)

(52) U.S. Cl.
CPC . *B23P 17/04* (2013.01); *B32B 3/14* (2013.01); *Y10T 29/49826* (2015.01)

(58) Field of Classification Search
CPC .................................. B23P 17/04; B32B 3/14
USPC ..................................................... 428/77, 78
See application file for complete search history.

(56) References Cited

U.S. PATENT DOCUMENTS

2010/0273530 A1  10/2010  Jarvis et al.
2012/0313392 A1*  12/2012  Bingle ......................... 296/1.08

FOREIGN PATENT DOCUMENTS

EP          2 360 665 A2    8/2011
KR       2011 0134617 A    12/2011
WO    WO 2008/101519 AI    8/2008
WO    WO 2012/043189 A1    4/2012

OTHER PUBLICATIONS

Nokia 701 Review, dated Oct. 5, 2011, [online] [retrieved Aug. 27, 2012]. Retrieved from the Internet: <URL: http://www.phonearena.com/reviews/Nokia-701-Review_id2841>. 6 pages.
New Cell Phone Review—New Cell Phones—p. 2, dated Jul. 14, 2012, [online] [retrieved Aug. 27, 2012]. Retrieved from the Internet: <URL: http://www.newcellphonesblog.com/new/new-cell-phone-review/page/2>. 6 pages.

* cited by examiner

*Primary Examiner* — Brent O'Hern
(74) *Attorney, Agent, or Firm* — Alston & Bird LLP

(57) ABSTRACT

A new arrangement of a display and optical element and method for manufacturing the same are provided. In the context of a method, a method is provided that includes providing first and second layers, wherein an extended portion of the first layer extends at least partially beyond a first edge of the second layer. The method further includes positioning an optical element in alignment with a translucent portion of the extended portion of the first layer. The method may also include modifying one or more portions of the extended portion of the first layer to be translucent.

10 Claims, 5 Drawing Sheets

APPARATUS AND METHOD OF MANUFACTURING A DISPLAY AND OPTICAL ELEMENT COMBINATION

TECHNOLOGICAL FIELD

Embodiments of the present invention relate generally to mobile electronic device technology and, more particularly relate to display and optical element combinations.

BACKGROUND

Mobile electronic devices are being manufactured with an increasing number of sensors and feedback elements. Because optical elements such as still and video cameras, ambient light sensors (ALS), proximity sensors, reminder lights, and the like, are designed to operate best with a field of view in the direction of the front surface of the device, device manufacturers often cluster these elements around the device's main display. As device display screens become increasingly large and manufacturers seek to eliminate more and more of the non-viewable space around them, it may become increasingly difficult to locate optical elements on the front surface of devices.

BRIEF SUMMARY

The exemplary embodiments of the present invention provide apparatuses and a method of manufacture providing a display and optical element combination. In this regard, the apparatuses and method of manufacture may provide a more space-efficient arrangement of an optical element and display.

In one embodiment, a method is provided that includes providing first and second layers, the first layer having an extended portion which extends at least partially beyond a first edge of the second layer. The method further includes positioning at least one optical element in alignment with a translucent portion of the extended portion of the first layer.

According to another embodiment, an apparatus is provided, the apparatus comprising first and second layers, the first layer having an extended portion which extends at least partially beyond a first edge of the second layer. The apparatus further includes at least one optical element, the at least one optical element being positioned in alignment with a translucent portion of the extended portion of the first layer.

According to yet another embodiment, an apparatus is provided, the apparatus comprising a display screen. The display screen comprises a first layer and a second layer, and an extended portion of the first layer extends at least partially beyond a first edge of the second layer. The apparatus further comprises at least one optical element, the optical element being positioned in alignment with a translucent portion of the first layer.

BRIEF DESCRIPTION OF THE SEVERAL VIEWS OF THE DRAWINGS

Figure 1A:
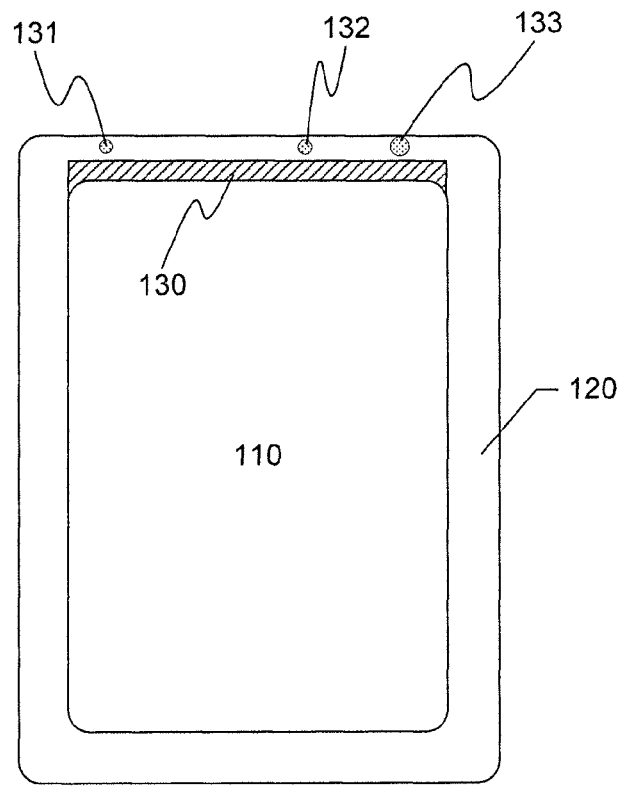
Figure 1B:
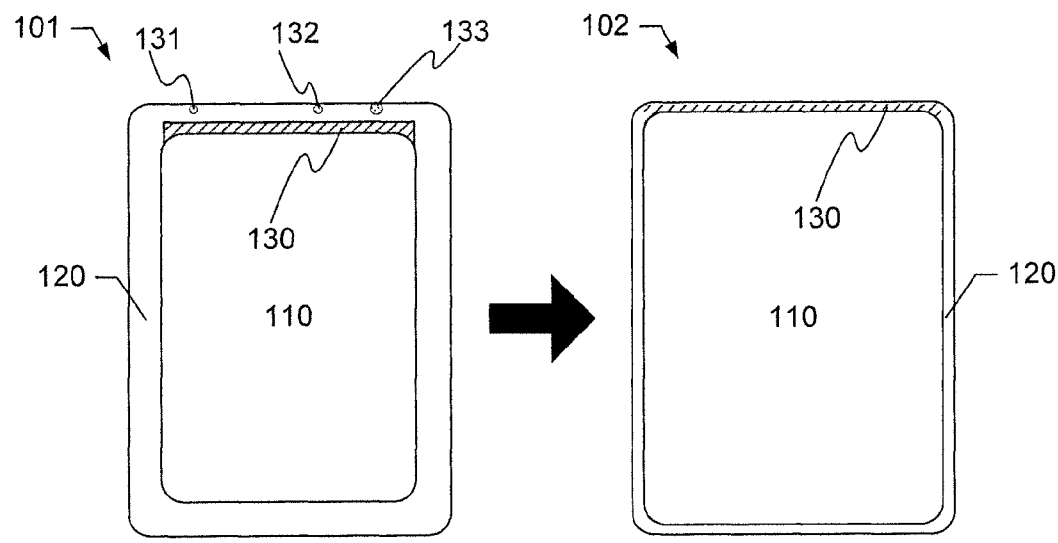
Figure 2A:
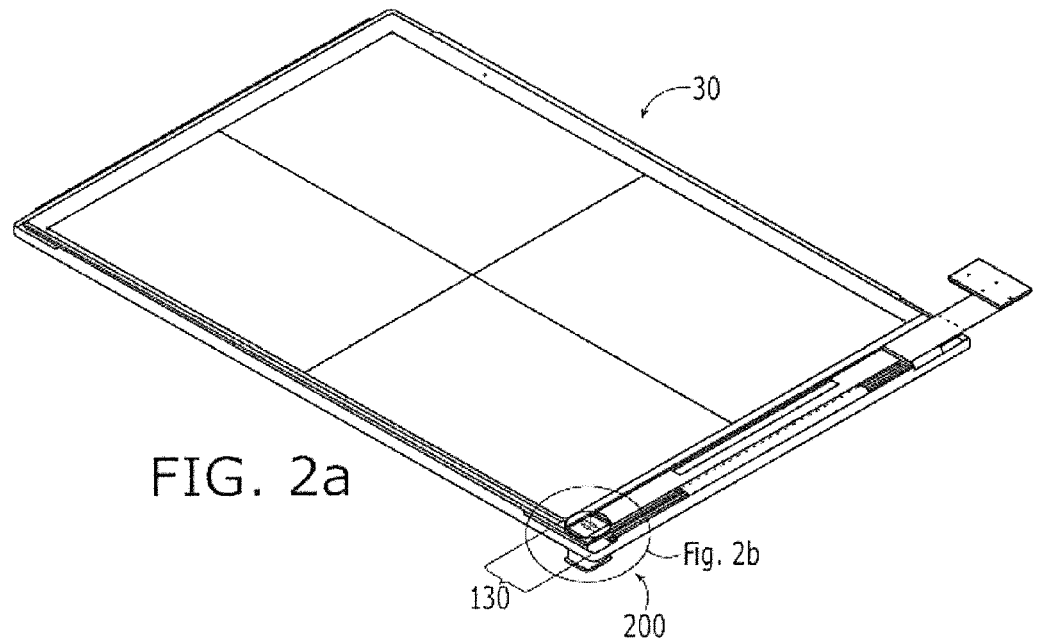
Figure 2B:
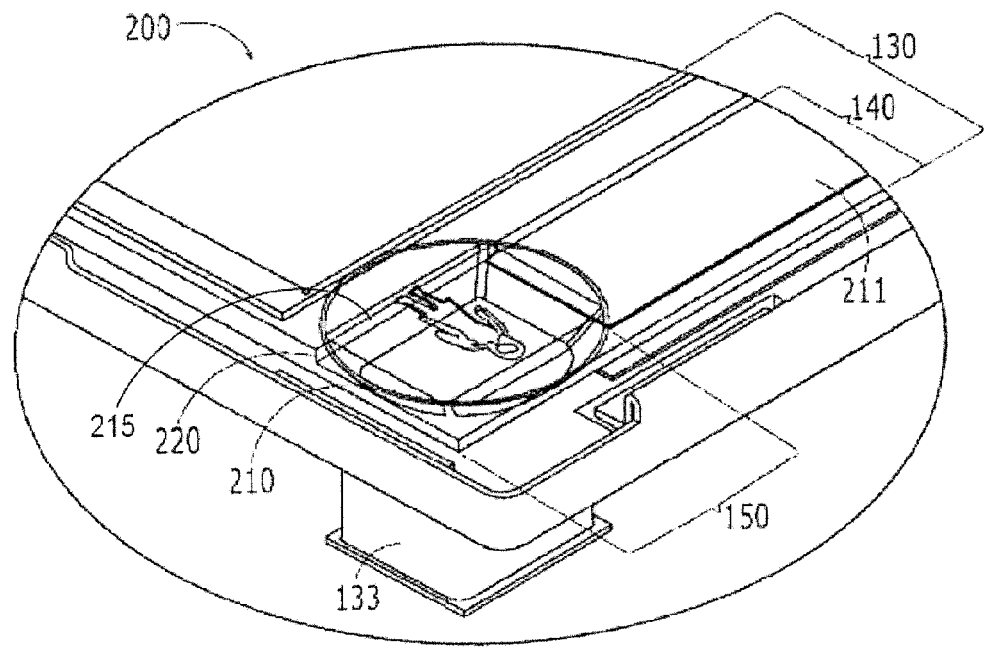
Figure 3A:
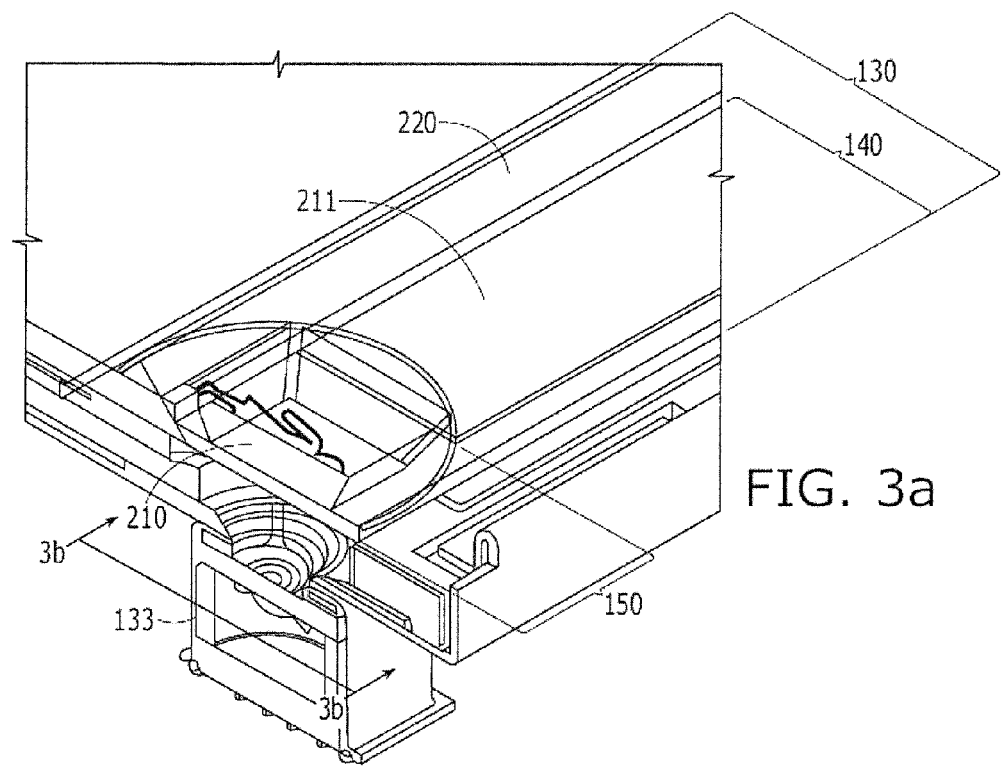
Figure 3B:
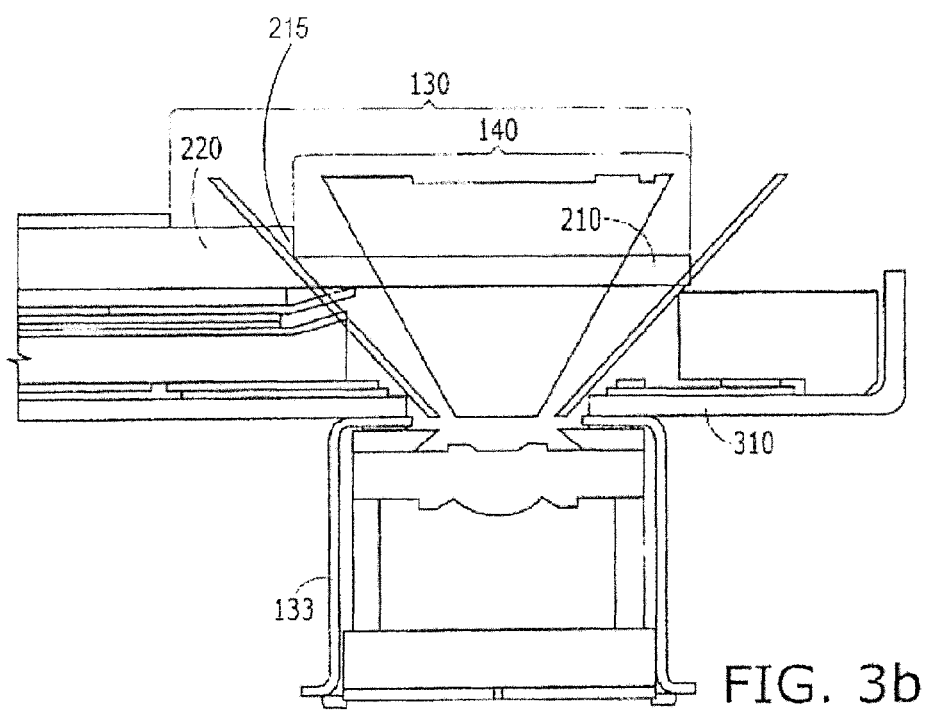
Figure 4:
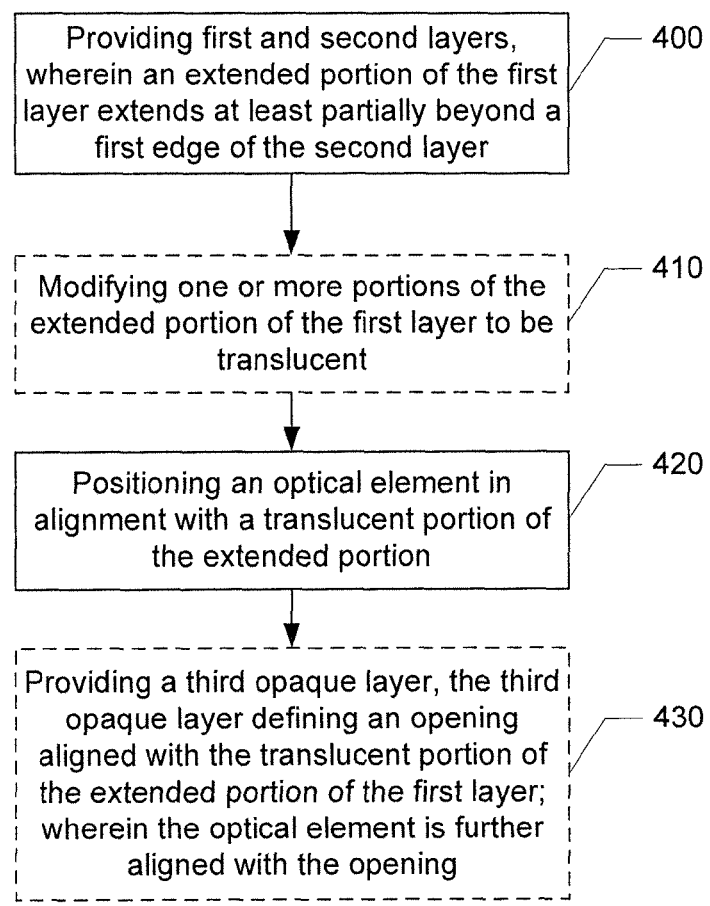
Figure 5:
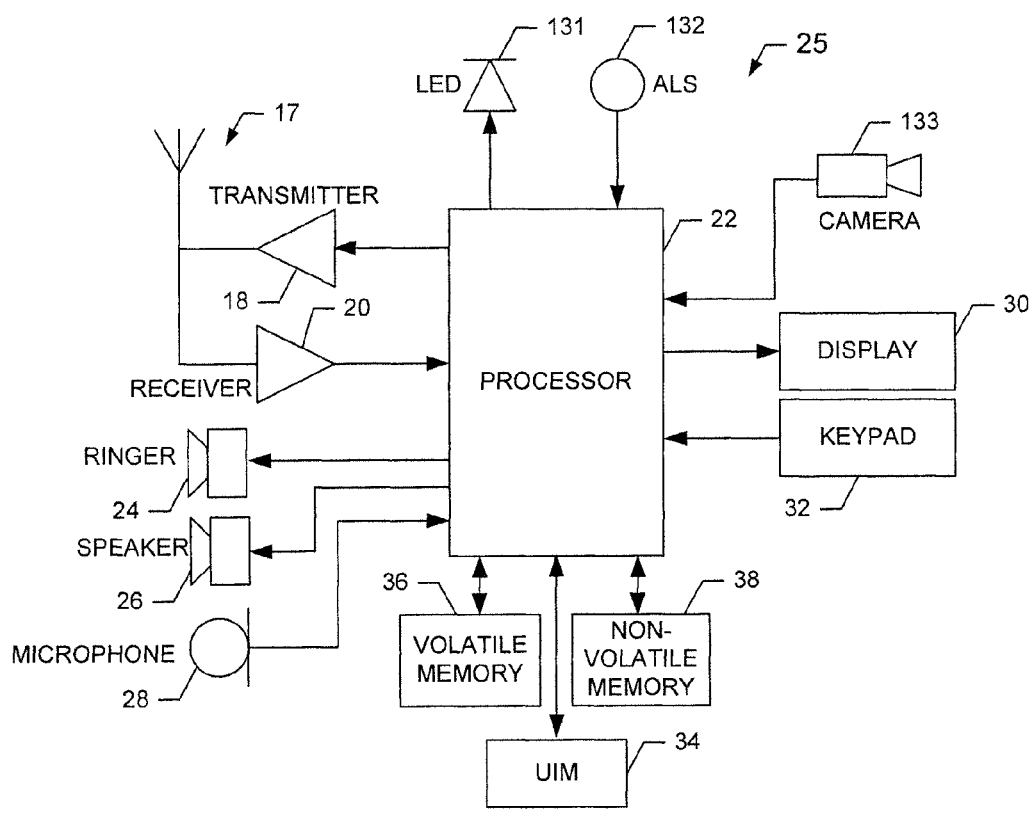

Having thus described the invention in general terms, reference will now be made to the accompanying drawings, which are not necessarily drawn to scale, and wherein:

FIGS. 1a and 1b are illustrations of the front surface of devices that may benefit from an embodiment of the present invention;

FIG. 2a is an illustration of a display screen that may benefit from an embodiment of the present invention;

FIG. 2b is an expanded view of a portion of the display screen depicted in FIG. 2a;

FIG. 3a is a cutaway view of the portion of the display screen depicted in FIG. 2b;

FIG. 3b is a side view of the cutaway portion of the display screen depicted in FIG. 3a;

FIG. 4 is a flowchart illustrating the steps for manufacturing an example embodiment of the present invention; and FIG. 5 is a schematic block diagram of an electronic device that may benefit from an embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As illustrated in FIG. 1a, many modern electronic devices contain a variety of sensors and feedback elements. Some of these sensors and feedback elements, such as optical elements like, for example, still and video cameras 133, ambient light sensors (ALS) 132, notification lights such as light emitting diodes (LED) 131, proximity sensors, gesture detection sensors, time-of-flight (TOF) sensors and the like are commonly clustered around the main display.

As illustrated in FIG. 1b, the placement of these sensors and feedback elements around the main display may conflict with a competing general trend in electronic devices with display screens, which is to maximize the active area of screens 110 with respect to the front surface of the electronic device. This necessarily involves decreasing the size of the non-display areas 120, such as bezels, where the abovementioned sensors and feedback elements are commonly located.

This conflict is exacerbated by properties of the display screens themselves. More specifically, screens based on display technologies such as liquid crystal display (LCD), organic LED, and others, may include inactive portions 130 which extend past the active area 110. Moreover, both the active and inactive portions of these screens are usually at least partially opaque, for example, because of shielding. Thus, because opaque inactive portion 130 of the display encroaches somewhat into the non-display portion 120 of the device, the portion of the non-display portion 120 which can actually accommodate the abovementioned sensors and feedback elements is even smaller than the entire width of the non-display portion.

It should be understood that the inactive portion 130 is often covered by a bezel 120 that may be made of metal or plastic in order to protect the inactive area. Therefore, although FIGS. 1a and 1b show inactive area 130, the inactive area in fact may not be visible as it may be covered by a non-display area 120, such as a bezel. It should be further understood that although FIGS. 1a and 1b only illustrate inactive portion 130 extending from the top edge of the active display area 110, one or more inactive areas 130 may extend from other edges, including multiple edges or all edges, of active area 110.

Comparing view 101 to view 102 illustrates the effect that increasing screen size may have on the ability to locate sensors and feedback elements. As can be seen in FIG. 1b, the non-display area 120 of view 101 is thick enough, even with inactive area 130, to accommodate sensors and feedback elements, such as LED 131, ALS 132, and camera 133. However, as view 102 shows, as the size of active area 110 increases and non-display area 120 decreases, eventually there may be no remaining room for sensors or feedback elements to be located around the screen. Furthermore, it may be undesirable for these sensors or feedback elements, such as optical elements, to be placed anywhere else, such as the rear or side of the electronic device, because they may be optically active and therefore may require a direct field of view in the direction of the front surface of the device. Thus either the non-display portion has to be big enough to accommodate the sensors or feedback elements, such as optical elements, or the sensors or feedback elements must be made smaller. Large non-display areas run counter to the trend of increasing display size, and decreasing the size of the sensors and feedback elements may be costly and technically challenging.

The issue of maximizing active display area 110 and minimizing non-display area 120 while still allowing sensing and feedback elements to be arranged around display area 110 can be solved by a new combination of a display and sensor and/or feedback elements. In this regard, a portion of the inactive area 130 of a normal display may be modified so that it is transparent. Utilizing this modification, one or more sensors and/or feedback elements, such as one or more optical elements, can now be placed behind, or affixed to, the inactive portion of the display, eliminating the need for a wide non-display area surrounding the active display area. This arrangement and the process for creating it will now be described in greater detail with reference to FIGS. 2 and 3.

Referring first to FIG. 2a, a typical display 30 for an electronic device is shown. The display 30 may be of any type appropriate for an electronic device and capable of being configured according to example embodiments described herein, with some examples including a plasma display panel (PDP), a liquid crystal display (LCD), a light-emitting diode (LED), an organic light-emitting diode display (OLED) or the like. Along an edge of display 30 is inactive area 130. As mentioned above, one or more inactive areas 130 may be located along any or all edges of display 30. Referring now to FIG. 2b, an enlarged view 200 of a corner of inactive area 130 is shown. As can be seen in FIG. 2b, the inactive area 130 may be comprised of a first layer 210 and a second layer 220. The first 210 and second 220 layers may, for example, be made of glass. The first 210 and second 220 layers may be in direct contact or there may be one or more intermediate layer in between the first 210 and second 220 layers. The first layer 210 may extend beyond an edge 215 of second layer 220 and at least a portion 150 of this extended portion 140 may be translucent (e.g., at least partially transparent). According to an example embodiment, the translucent portion 150 of the extended portion 140 may be modified to be translucent, such as, for example, by removing shielding, cables, integrated circuit (IC) drivers or other opaque components or elements. According to another example embodiment, the translucent portion 150 of extended portion 140 may be made or left translucent during the manufacturing of screen 30. According to a further example embodiment, the translucent portion could be configured to have active display functions. For example, the translucent portion may be manufactured using transparent conducting layers, such as, for example, indium tin oxide (ITO) layers. According to a further example embodiment, other portions 211 of extended portion 140 may be left opaque. It should be understood that multiple translucent portions 150 may be provided along extended portion 140.

Referring now to FIGS. 3a and 3b, one or more sensor or feedback elements, such as optical elements like, for example camera 133, may be positioned in alignment with the one or more translucent portions 150 and adjacent to the edge 215 of the second layer. According to another embodiment, the one or more sensor or feedback elements may be affixed to the one or more translucent portions 150. For example, the one or more sensor or feedback elements may be attached to the back of, or embedded in, the one or more translucent portions 150. In this way, the sensor or feedback elements, such as optical elements, may "look" through the transparent portions 150 of extended portion 140. According to an example embodiment, additional opaque layers may also be provided. For example, an opaque layer 310 may be provided between the sensor or feedback elements, such as optical elements, and the first 210 and second 220 layers. Alternatively, or in addition, an opaque layer, such as, for example, a decorative and/or protective baffle, may be provided above the first and second layers (not pictured). According to an example embodiment, the opaque layer(s) may define one or more openings, which any sensors and/or feedback elements, such as optical elements, may be aligned with.

Having described example embodiments of the combination of a display and one or more sensors and/or feedback elements, such as optical elements, a method for manufacturing the same will now be described with reference to FIG. 4. In this regard, a method of manufacture according to an example embodiment may include providing first 210 and second 220 layers. See operation 400. An extended portion 140 of the first layer may extend at least partially beyond a first edge of the second layer 220. See operation 400. An example embodiment may also include modifying one or more portions of the extended portion of the first layer to be translucent. See operation 410. The method may further include positioning one or more sensors and/or feedback elements, such as one or more optical elements, in alignment with a translucent portion of the extended portion, such as in alignment with the one or more portions of the extended portion of the first layer which may have been modified to be translucent. See operation 420. Another example embodiment may include providing a third opaque layer. See operation 430. The opaque layer may, for example, define one or more openings aligned with the one or more translucent portions of the extended portion of the first layer. See operation 430. The one or more sensors and/or feedback elements, such as one or more optical elements, may be further aligned with the one or more openings in the opaque layer. See operation 430.

In one embodiment, a mobile terminal may implement an embodiment of the present invention. In this regard, a block diagram of a mobile terminal 25 that would benefit from embodiments of the present invention is illustrated in FIG. 5. It should be understood, however, that the mobile terminal 25 as illustrated and hereinafter described is merely illustrative of one type of user device that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user devices including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device, which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms. For example, mobile terminal 25 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example.

The mobile terminal 25 may also comprise a user interface including an output device such as a conventional earphone or speaker 26, a ringer 24, a microphone 28, a display 30, an LED 131, and a user input interface, all of which are coupled to the processor 22. The display 30 of the mobile terminal may be of any type appropriate for the electronic device in question with some examples including a plasma display panel (PDP), a liquid crystal display (LCD), a light-emitting diode (LED), an organic light-emitting diode display (OLED) or the like. The user input interface, which allows the mobile terminal 25 to receive data, may include any of a number of devices allowing the mobile terminal 25 to receive data, such as a keypad 32, a touch screen display (display 30 providing an example of such a touch screen display), camera 133, light sensor 132, or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 25 may also include other non-volatile memory 38, which may be embedded and/or may be removable. The memories may store any of a number of pieces of information, and data, used by the mobile terminal 25 to implement the functions of the mobile terminal 25.

As described above, FIG. 4 illustrates a flowchart of a method for manufacturing an example embodiment of the invention. It will be understood that each block of the flowchart, and combinations of blocks in the flowchart, may be implemented by various means, such as by hand or by automated, such as robotic, manufacturing and/or assembly means or the like. Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based manufacturing systems which perform the specified functions, or combinations of special purpose hardware manufacturing systems and computer instructions.

In some embodiments, certain ones of the operations above may be modified or enhanced. Furthermore, in some embodiments, additional optional operations may be included. Moreover, some operations may be optional, as indicated by dashed lines and, as such, may be omitted in some cases. Modifications, additions, or enhancements to the operations above may be performed in any order and in any combination.

The embodiments described above provide many advantages. For example electronic devices implementing embodiments of the present invention may provide an improved ratio of active display area to front surface. Moreover, embodiments of the present invention may allow electronic device manufacturers to omit or at least reduce the size of bezels and other types of borders commonly placed around display screens and therefore to create devices that are less bulky and more aesthetically pleasing. In addition, embodiments of the present invention may add relatively little cost to manufacturing compared to other solutions such as shrinking the size of sensors and/or feedback elements or locating sensors and/or feedback elements behind fully-transparent displays. Embodiments of the present invention may also utilize standard displays and therefore require little, if any, specialized manufacturing processes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    a display comprising a first layer and a second layer, wherein the second layer overlies the first layer and wherein an extended portion of the first layer extends at least partially beyond a first edge of the second layer and comprises a translucent portion;
    wherein the second layer defines an active area of the display comprising one of a plasma display panel, a liquid crystal display, a light-emitting diode display, or an organic light-emitting diode display, wherein the extended portion of the first layer extending at least partially beyond the first edge of the second layer defines an inactive area of the display; and
    at least one optical element, the at least one optical element being positioned in optical alignment with the translucent portion of the extended portion of the first layer and the optical element being adjacent to the first edge of the second layer.

2. The apparatus of claim 1, wherein one or more portions of the extended portion of the first layer have been modified to be translucent.

3. The apparatus of claim 1, further comprising:
    a third opaque layer, the third opaque layer defining an opening aligned with the translucent portion of the extended portion of the first layer;
    wherein the at least one optical element is further aligned with the opening.

4. The apparatus of claim 1, wherein the at least one optical element comprises at least one of a light emitting diode (LED), an ambient light sensor (ALS), a proximity sensor, a gesture detection sensor, a time-of-flight (TOF) sensor, or a camera.

5. The apparatus of claim 1, wherein the at least one optical element is affixed to the translucent portion.

6. An apparatus comprising:
    a display screen, the display screen comprising a first and second layer, wherein an extended portion of the first layer extends at least partially beyond a first edge of the second layer, wherein the second layer defines an active area of the display; and
    at least one optical element, the optical element being positioned in alignment with a translucent portion of the extended portion of the first layer and the optical element being adjacent to the first edge of the second layer.

7. The apparatus of claim 6, wherein one or more portions of the extended portion of the first layer have been modified to be translucent.

8. The apparatus of claim 6, wherein the display screen further comprises a third opaque layer, the third opaque layer defining an opening aligned with the translucent portion of the extended portion of the first layer;
    further wherein the at least one optical element is aligned with the opening.

9. The apparatus of claim 6, wherein the optical element comprises one of a light emitting diode (LED), an ambient light sensor (ALS), a proximity sensor, a gesture detection sensor, a time-of-flight (TOF) sensor, or a camera.

10. The apparatus of claim 6, wherein the at least one optical element is affixed to the translucent portion.

* * * * *